Patented Mar. 28, 1944

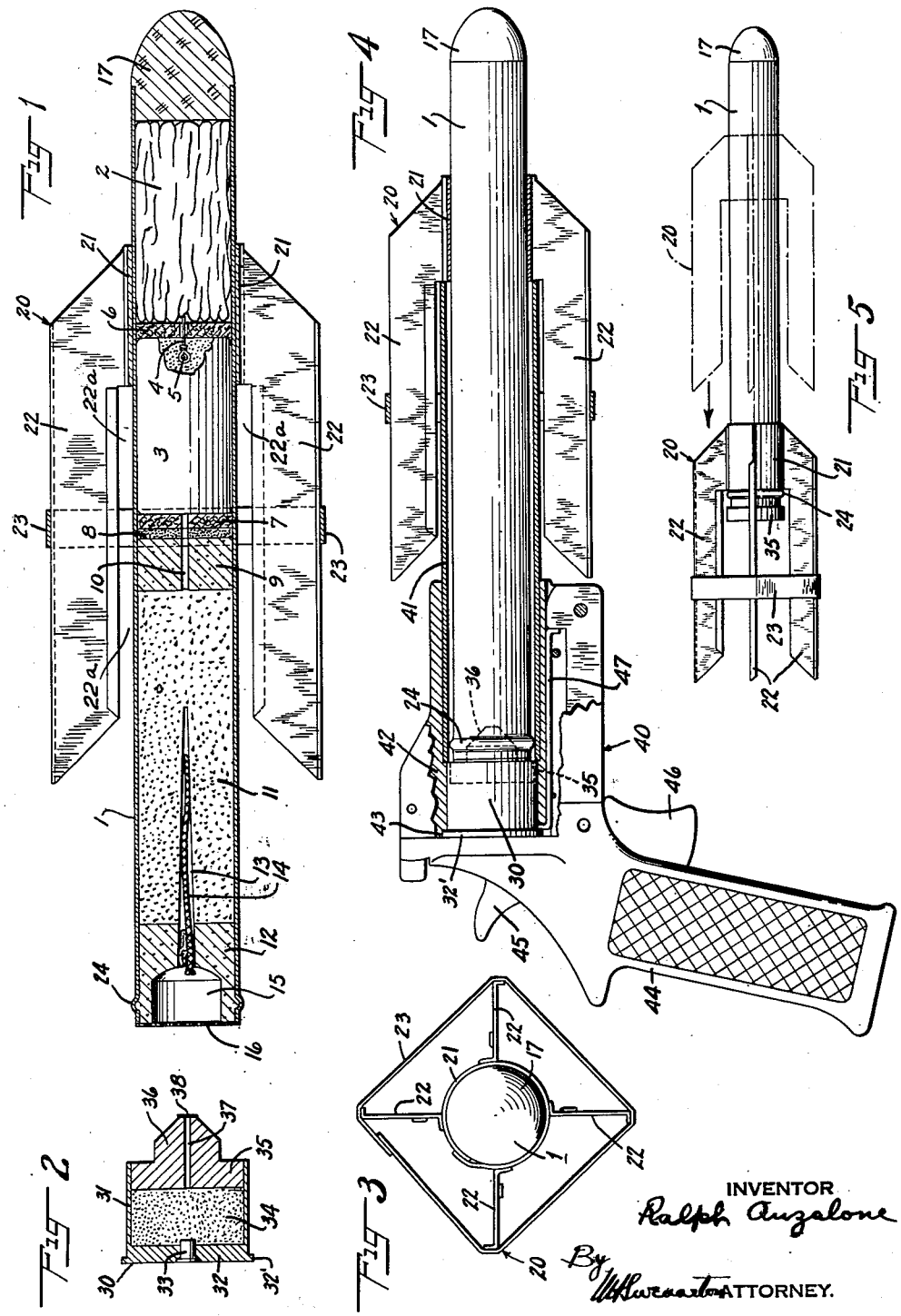

2,344,957

UNITED STATES PATENT OFFICE 2,344,957

PISTOL ROCKET

Ralph Anzalone, Oceanside, N. Y., assignor to Aerial Products, Inc., New York, N. Y., a corporation of Delaware Application January 12, 1940, Serial No. 313,580

4 Claims. (Cl. 102—35)

This invention relates to rocket flares of the parachute type and has for its principal objects the provision of a simple, cheap and safe flare of that character which is capable of ascending to remarkable heights when discharged from an ordinary hand firearm or pistol.

It is known that heretofore rocket flares have been devised which were adapted to release a candle-carrying parachute and these prior rocket flares were capable of ascending to a height of several hundred feet before the parachute was launched therefrom. However, it was necessary to employ cumbersome ground mortars or the like to propel the rocket flares into the air, since the rocket stick precluded the use of a hand firearm or pistol such as is commonly employed for shooting parachute flares into the air.

Research has led to the development of an improved rocket flare construction which can be propelled into the air from a pistol and which possesses all of the advantages of the most efficient rocket flares heretofore devised besides having remarkable flight characteristics notwithstanding the fact that no guide stick is employed therein.

The invention is fully disclosed in the following description and drawing forming a part thereof in which latter Figure 1 is a longitudinal vertical section of a rocket parachute flare embodying the invention, isolated from the hurtling pistol;

Fig. 2 is a vertical section of the projectile slug;

Fig. 3 is a front elevation of the rocket parachute flare;

Fig. 4 is a side elevation, partly broken away of the rocket parachute flare in position in the launching pistol; and Fig. 5 is a longitudinal elevation of the rocket flare in flight.

Referring to the drawing and the construction shown therein, the reference numeral 1 designates the cylindrical shell of the rocket parachute flare and 2 the parachute which is packed in the forward end thereof. A flare candle 3, of the type commonly used in parachute signal flares, is secured by a connecting wire 4, whose enlarged looped end 5 is anchored therein, to the shroud lines of the chute. Centrally apertured felt washers 6 and 7 seal the respective ends of the chamber in which said candle is positioned. A black powder charge 8 which is centrally apertured, is positioned between the washer 7 and a centrally apertured clay separator or abutment plug 9 which is interposed between said powder charge 8 and a second powder charge 11 that is of the composition usually employed in rockets. A second clay abutment plug 12 seals the rear end of the casing 1. A fuse recess 13 is formed in the powder charge 11 and said plug 12 for the reception of the fuse 14 which preferably protrudes into the bottom of an enlarged terminal recess or ignition chamber 15 formed in the plug 12. A waterproof paper protective cap 16 normally seals the end of the recess 15 while the front end of the casing 1 is plugged by a member 17 having a rounded nose or tip.

Said casing 1 is equipped with a guiding device 20, comprising a cylindrical sleeve 21, slidable on the casing 1, to which four radial vanes 22 are brazed or otherwise rigidly united, said vanes being disposed at 90° intervals along the periphery of the sleeve. The vanes, it will be noted, also extend in the axial direction of the body 1 toward its rear or trailing end. A reinforcing band 23 encircles said vanes and is rigidly secured to the respective outer edges thereof. The bead 24 on the end of the shell or casing 1, serves as a stop to prevent the guiding device 20 escaping off the rear end of the casing 1 while the rocket is in flight (see Fig. 5).

A separate firing plug 30, comprising a shell 31, a base member 32 having a peripheral retaining flange 32', a detonator cap 33 mounted in a central aperture in the base, a powder charge 34 and a closure plug having a reduced end or nose 36, which latter is adapted to loosely fit within the terminal chamber 15 of the casing 1. Said nose 36 has a central duct or spark hole 37 formed therein which is normally hermetically sealed by a waterproof wafer 38 and which duct, upon the dislodgment of the wafer 38, affords communication between the powder chamber of the plug 30 and the fuse recess 13, thereby admitting of the ignition of the end of the fuse 14 by the flame or sparks propelled from the powder chamber when the charge therein is ignited by the detonation of the cap 33, all in the manner hereinafter described.

The rocket flare is hurtled into the air by means of the well known hand gun or pistol 40, the same having a barrel 41 with which the casing 1 has a sliding fit, a breech 42 which has an annular recess 43 to receive the flange 32' of the firing plug, a handle 44, hammer 45, a trigger 46 having a firing pin loosely mounted therein, and firing plug ejector bar 47.

In order to hurtle the improved rocket into the air, the projectile plug 30 is inserted in the pistol in the position illustrated in Fig. 4. The casing 1, loaded as above described, is then dropped into the barrel from the muzzle thereof while the latter is held upright and thereby the nose 36 of the projectile plug will fracture the wafer 16 and penetrate into the recess 15 in which position the rear end of the plug 12, which is still coated by the residual unbroken ring of the paper wafer 16, will engage the annular front end face of the projectile plug 35. The insertion of the rocket flare into the muzzle of the pistol forces the guiding device 20 forwardly on the casing 1 into the position shown in Fig. 4.

The parts now being assembled in the pistol as aforesaid, the pistol is aimed, usually vertically in order that the rocket will attain its maximum height before the parachute is launched, and then the trigger having been cocked in the interim, the same is then tripped by squeezing the same in the usual manner. The tripping of the trigger causes the firing pin, loosely mounted in the trigger, to detonate the cap, whereupon the powder charge 34 is exploded, the cap 38 blown away and the projectile plug 35 is hurtled against the casing 1 which is thereby explosively propelled from the barrel 41, but only after the flame or sparks from the exploded charge have been first propelled through the duct 37 into the fuse recess 13 wherein the instant ignition of the fuse 14 is effected. While the amount of the explosive charge which I preferably employ in the firing plug 30 is usually merely sufficient to project the rocket flare and projectile plug 35 some 25 or 30 feet beyond the end of the pistol barrel, at which point they separate and the plug drops harmlessly to the ground, nevertheless since the burning fuse ignites those areas of the rocket powder exposed thereto, it will effect the progressive explosive combustion of such powder in the well known manner. The reaction from the explosive gases will effect the rocket-like propulsion of the loaded casing 1, with its guide means, through the air and said latter means will insure the arrow-like flight of such casing until the rocket powder is consumed and there is no further propellant action from the gaseous products of combustion issuing through the fuse recess in the plug 12. Simultaneously with such cessation of flight of the casing, powder charge 8 will become ignited by sparks from the remnants of the burning rocket powder which travel thereto through duct 10 and thereupon such powder will explode, igniting the candle flare and explosively propelling into space the disc 7, the candle, the disc 6, the folded parachute and cork 17. Thereupon the pull of gravity upon the candle, which is attached to the shroud lines of the chute, will cause the chute to open in the well known manner, thereby supporting the candle as it soars in the air currents until the same is completely consumed.

Preferably the casing 1 and its guides, as well as the plug 30, are formed of metal, though the same may be formed of plastics, paper or other suitable material.

It will be observed that each wing 22 to the rear of its attachment to the sliding ring 21 is recessed, as indicated at 22a, so that when the casing 1 is inserted into the barrel 41 the recesses will receive the barrel and the vanes will not impede such insertion but will overlie the exterior of the said barrel, as shown in Fig. 4.

The slidable guide means employed in the improved rocket flare, not only enables me to dispense with a long unwieldy stick, such as is commonly employed in ordinary rockets, in order to guide the same in flight, but particularly it serves to permit of the rocket being discharged in the manner herein described to remarkable heights, say from 750 to 1,000 feet depending on the amount and character of the rocket powder charge employed, from a pistol of the type commonly used for discharging parachute flares into the air wherein the charge of powder employed in the propelling slug is relatively small and insufficient to cause an objectionable "kick" when the pistol is fired.

My improved rocket flare is especially important for signalling at sea and in warfare because of the ease with which the parachute flare can be projected to great heights from a pistol without necessitating a special mortar or other launching equipment for that purpose.

Various modifications within the scope of the appended claims may be made in the construction of the rocket flare disclosed herein without departing from the spirit of my invention.

Having thus described my invention, what I claim and desire to obtain by United States Letters Patent is:

1. A projectile adapted to be discharged from a barrel of a firing piece comprising a body, a portion of which is adapted to be inserted into said barrel, means to guide the flight of said projectile after its discharge from said barrel, said means comprising a support member movable slidably on said body, guiding vanes attached to said support member and extending therefrom laterally and also in the direction of said body toward its trailing end, said vanes each being recessed in a portion thereof to receive said barrel whereby the vanes extend over and lie exteriorly of the barrel when said body is inserted into the barrel, said support member then lying on a forward portion of said body and said support member, carrying with it said vanes, sliding along said body toward the trailing end of the latter upon discharge of the projectile from said firing piece, and means on said body to limit the extent of such sliding movement.

2. A device, as per claim 1, including reinforcing means encircling said vanes.

3. A projectile adapted to be fired from a barrel of a firing piece comprising an elongated body, a portion of which is adapted to be inserted into said barrel, means to guide the flight of said projectile after its discharge from said barrel, said means including a ring member movable slidably over said projectile, guiding vanes rigidly attached to said ring member and extending therefrom laterally and in the axial direction of said body toward its trailing end, said vanes each having a recess in a portion thereof adjacent the body to receive the barrel whereby they extend over and lie exteriorly of the barrel when said portion of said body is inserted into said barrel for firing therefrom, said ring member then lying on a portion of said body ahead of the portion inserted into said barrel, and said ring member, carrying with it said vanes, sliding along said body toward the trailing end of the latter upon discharge of the projectile from said firing piece, and means on said body adjacent its trailing end to limit the extent of such slide.

4. In a device, as per claim 3, a reinforcing band surrounding said vanes and attached rigidly to an outer edge of each.

RALPH ANZALONE.